US009852009B2

(12) United States Patent
Chen et al.

(10) Patent No.: US 9,852,009 B2
(45) Date of Patent: Dec. 26, 2017

(54) METHOD FOR OPTIMIZING UTILIZATION OF WORKLOAD-CONSUMED RESOURCES FOR TIME-INFLEXIBLE WORKLOADS

(71) Applicant: ProphetStor Data Services, Inc., Taichung (TW)

(72) Inventors: Wen Shyen Chen, Taichung (TW); Wen Chieh Hsieh, New Taipei (TW); Ming Jen Huang, Taichung (TW); Tsung Ming Shih, Tainan (TW)

(73) Assignee: Prophetstor Data Services, Inc., Taichung (TW)

( * ) Notice: Subject to any disclaimer, the term of this patent is extended or adjusted under 35 U.S.C. 154(b) by 102 days.

(21) Appl. No.: 15/149,211

(22) Filed: May 9, 2016

(65) Prior Publication Data
US 2017/0322831 A1      Nov. 9, 2017

(51) Int. Cl.
*G06F 9/46* (2006.01)
*G06F 9/50* (2006.01)

(52) U.S. Cl.
CPC ............ *G06F 9/505* (2013.01); *G06F 9/5083* (2013.01)

(58) Field of Classification Search
None
See application file for complete search history.

(56) References Cited

U.S. PATENT DOCUMENTS

| | | | | |
|---|---|---|---|---|
| 2002/0194251 | A1* | 12/2002 | Richter | ................ G06F 9/4825 718/103 |
| 2010/0082320 | A1* | 4/2010 | Wood | ................... G06F 9/5011 703/22 |

* cited by examiner

*Primary Examiner* — Dong Kim
(74) *Attorney, Agent, or Firm* — Che-Yang Chen; Law Offices of Scott Warmuth

(57) ABSTRACT

Methods for optimizing utilization of workload-consumed resources for time-inflexible workloads are disclosed. By sorting workload-consumed resource profiles representing individual workloads in one system according to an order of standard deviation or descending volume, two workload-consumed resource profiles can be combined to check if combination criteria are fulfilled. If any combination satisfies the combination criteria, corresponding workloads can be combined to share the same resource from the system. Thus, optimizing utilization of the workload-consumed resource can be achieved.

15 Claims, 7 Drawing Sheets

| No. | Step | Operation | | | | Result | | | | | |
|---|---|---|---|---|---|---|---|---|---|---|---|
| | | | WL1 | WL2 | WL3 | WL4 | WL5 | WL6 | WL7 | WL8 | WL9 |
| 1 | S01 | Workload | WL1 | WCRP2 | WCRP3 | WCRP4 | WCRP5 | WCRP6 | WCRP7 | WCRP8 | WCRP9 |
| 2 | S01 | Workload-Consumed Resource Profile (WCRP) | WCRP1 | SD2 | SD3 | SD4 | SD5 | SD6 | SD7 | SD8 | SD9 |
| 3 | S01 | Standard Deviation (SD) | SD1 | | | | | | | | |
| 4 | S02 | Volume Unit (VU) | | | | | 1500 | | | | |
| 5 | S03 | Asending Order of Standard Deviation | SD7 | < SD4 | < SD2 | < SD3 | < SD1 | < SD9 | < SD8 | < SD6 | < SD5 |
| 6 | S03 | Sequence of WCRP according to SD | WCRP7 | WCRP4 | WCRP2 | WCRP3 | WCRP1 | WCRP9 | WCRP8 | WCRP6 | WCRP5 |
| 7 | S04 | Test WCRP | | | | | WCRP7 | | | | |
| 8 | S04 | Target WCRP | | | | | WCRP4 | | | | |
| 9 | S05 | Combined WCRP | | | | WCRP7 + WCRP4 | | | | | |
| 10 | S06 | SD of Combined WCRP | | | | < SD of Test WCRP (SD7) | | | | | |
| 11 | S06 | Maximum of Combined WCRP | | | | > VU | | | | | |
| 12 | S09 | Target WCRP | | | | | WCRP2 | | | | |
| 13 | S05 | Combined WCRP | | | | WCRP7 + WCRP2 | | | | | |
| 14 | S06 | SD of Combined WCRP | | | | < SD of Test WCRP (SD7) | | | | | |
| 15 | S06 | Maximum of Combined WCRP | | | | < VU | | | | | |
| 16 | S07 | New WCRP | | | | CWCRP1 (= WCRP7 + WCRP2) | | | | | |
| 17 | S08 | Final WCRP | CWCRP1 | WCRP4 | WCRP3 | WCRP1 | WCRP9 | WCRP8 | WCRP6 | WCRP5 | |
| 18 | S08 | Final Workload(s) for Assigned Resource | WL7+WL2 | WL4 | WL3 | WL1 | WL9 | WL8 | WL6 | WL5 | |

Fig. 3

| No. | Step | Operation | Result | | | | | | | | |
|---|---|---|---|---|---|---|---|---|---|---|---|
| - | - | Sequence of WCRP according to SD | CWCRP1 | WCRP4 | WCRP3 | WCRP3 | WCRP1 | WCRP9 | WCRP8 | WCRP6 | WCRP5 |
| - | - | New Test WCRP | | | | | CWCRP1 | | | | |
| - | - | Target WCRP | WCRP4 | WCRP3 | WCRP1 | WCRP9 | WCRP8 | WCRP6 | WCRP5 | | |
| 19 | S04-S07 (S10) | Result of SD of Combination of New Test WCRP and Target WCRP | < SD of NT | < SD of NT | > SD of NT | > SD of NT | > SD of NT | > SD of NT | | | |
| - | - | Result of Maximum of Combined WCRP | > VU | > VU | < VU | < VU | < VU | < VU | < VU | | |
| - | - | Sequence of WCRP according to SD | CWCRP1 | WCRP4 | WCRP3 | WCRP1 | WCRP9 | WCRP8 | WCRP6 | WCRP5 | |
| - | - | New Test WCRP | | | | | WCRP4 | | | | |
| - | - | Target WCRP | WCRP3 | WCRP1 | WCRP9 | WCRP8 | WCRP6 | WCRP5 | | | |
| 20 | S11-S16 | Result of SD of Combination of New Test WCRP and Target WCRP | < SD of NT | < SD of NT | < SD of NT | > SD of NT | > SD of NT | > SD of NT | | | |
| - | - | Result of Maximum of Combined WCRP | > VU | > VU | > VU | > VU | > VU | > VU | | | |
| - | - | Sequence of WCRP according to SD | CWCRP1 | WCRP4 | WCRP3 | WCRP1 | WCRP9 | WCRP8 | WCRP6 | WCRP5 | |
| - | - | New Test WCRP | | | | | WCRP3 | | | | |
| - | - | Target WCRP | WCRP1 | WCRP9 | WCRP8 | | | | | | |
| 21 | S11-S16 | Result of SD of Combination of New Test WCRP and Target WCRP | < SD of NT | < SD of NT | < SD of NT | | | | | | |
| - | - | Result of Maximum of Combined WCRP | > VU | > VU | < VU | | | | | | |
| - | - | Sequence of WCRP according to SD | CWCRP1 | CWCRP2 | WCRP4 | WCRP1 | WCRP9 | WCRP8 | WCRP6 | WCRP5 | |
| - | - | New Test WCRP | CWCRP2 | | | | | | | | |
| - | - | Target WCRP | < SD of NT | | | | | | | | |
| 22 | S10-S16 | Result of SD of Combination of New Test WCRP and Target WCRP | < VU | | | | | | | | |
| - | - | Result of Maximum of Combined WCRP | CWCRP3 | WCRP4 | WCRP1 | WCRP9 | WCRP6 | WCRP5 | | | |
| - | - | Sequence of WCRP according to SD | CWCRP3 | WCRP4 | WCRP1 | WCRP9 | WCRP6 | WCRP5 | | | |
| - | - | New Test WCRP | | | | | CWCRP3 | | | | |
| - | - | Target WCRP | WCRP4 | WCRP1 | WCRP9 | WCRP6 | WCRP5 | | | | |
| 23 | S10-S16 | Result of SD of Combination of New Test WCRP and Target WCRP | < SD of NT | < SD of NT | < SD of NT | > SD of NT | > SD of NT | | | | |
| - | - | Result of Maximum of Combined WCRP | > VU | > VU | < VU | < VU | > VU | | | | |
| - | - | Sequence of WCRP according to SD | CWCRP3 | WCRP4 | WCRP1 | WCRP9 | WCRP6 | WCRP5 | | | |
| - | - | New Test WCRP | | | | | WCRP4 | | | | |
| - | - | Target WCRP | WCRP1 | WCRP9 | WCRP6 | WCRP5 | | | | | |
| 24 | S11-S16 | Result of SD of Combination of New Test WCRP and Target WCRP | < SD of NT | < SD of NT | > SD of NT | < SD of NT | | | | | |
| - | - | Result of Maximum of Combined WCRP | > VU | > VU | < VU | < VU | | | | | |

Fig. 5

| No. | Step | Operation | | | | Result: | | | |
| --- | --- | --- | --- | --- | --- | --- | --- | --- | --- |
| - | - | Sequence of WCRP according to SD | CWCRP3 | WCRP4 | WCRP1 | WCRP9 | WCRP6 | WCRP5 | |
| 25 | S11-S16 | New Test WCRP | WCRP9 | WCRP6 | WCRP5 | | WCRP1 | | |
|  |  | Target WCRP | < SD of NT | < SD of NT | > SD of NT | | | | |
|  |  | Result of SD of Combination of New Test WCRP and Target WCRP | > VU | > VU | < VU | | | | |
|  |  | Result of Maximum of Combined WCRP | | | | | | | |
| - | - | Sequence of WCRP according to SD | CWCRP3 | WCRP4 | WCRP1 | WCRP9 | WCRP6 | WCRP5 | |
|  |  |  |  |  |  |  | WCRP9 |  | |
| 26 | S11-S16 | New Test WCRP | WCRP6 | WCRP5 | | | | | |
|  |  | Target WCRP | < SD of NT | < SD of NT | | | | | |
|  |  | Result of SD of Combination of New Test WCRP and Target WCRP | > VU | > VU | | | | | |
|  |  | Result of Maximum of Combined WCRP | | | | | | | |
| - | - | Sequence of WCRP according to SD | CWCRP3 | WCRP4 | WCRP1 | WCRP9 | WCRP6 | WCRP5 | |
|  |  |  |  |  |  |  | WCRP6 |  | |
| 27 | S11-S16 | New Test WCRP | WCRP5 | | | | | | |
|  |  | Target WCRP | < SD of NT | | | | | | |
|  |  | Result of SD of Combination of New Test WCRP and Target WCRP | < VU | | | | | | |
|  |  | Result of Maximum of Combined WCRP | | | | | | | |
| - | - | Sequence of WCRP according to SD | CWCRP3 | WCRP4 | CWCRP4 | WCRP1 | WCRP9 | | |
|  |  |  |  |  |  |  | CWCRP3 |  | |
| 28 | S10-S16 | New Test WCRP | WCR24 | CWCRP4 | WCRP1 | WCRP9 | | | |
|  |  | Target WCRP | < SD of NT | < SD of NT | > SD of NT | > SD of NT | | | |
|  |  | Result of SD of Combination of New Test WCRP and Target WCRP | > VU | > VU | < VU | < VU | | | |
|  |  | Result of Maximum of Combined WCRP | CWCRP3 | WCRP4 | CWCRP4 | WCRP1 | WCRP9 | | |
|  |  |  |  |  |  |  | WCRP4 |  | |
| - | - | Sequence of WCRP according to SD | CWCRP4 | WCRP1 | WCRP9 | | | | |
| 29 | S10-S16 | New Test WCRP | < SD of NT | < SD of NT | > SD of NT | | | | |
|  |  | Target WCRP | > VU | > VU | < VU | | | | |
|  |  | Result of SD of Combination of New Test WCRP and Target WCRP | CWCRP3 | WCRP4 | CWCRP4 | WCRP1 | WCRP9 | | |
|  |  | Result of Maximum of Combined WCRP | | | | | | | |
| - | - | Sequence of WCRP according to SD | CWCRP3 | WCRP4 | CWCRP4 | WCRP1 | WCRP9 | | |
|  |  |  |  |  |  |  | CWCRP4 |  | |
| 30 | S11-S16 | New Test WCRP | WCRP1 | WCRP9 | | | | | |
|  |  | Target WCRP | < SD of NT | < SD of NT | | | | | |
|  |  | Result of SD of Combination of New Test WCRP and Target WCRP | > VU | > VU | | | | | |
|  |  | Result of Maximum of Combined WCRP | CWCRP3 | WCRP4 | CWCRP4 | WCRP1 | WCRP9 | | |
|  |  |  |  |  |  |  | WCRP1 |  | |
| 31 | S11-S16 | New Test WCRP | WCRP9 | | | | | | |
|  |  | Target WCRP | < SD of NT | | | | | | |
|  |  | Result of SD of Combination of New Test WCRP and Target WCRP | > VU | | | | | | |
|  |  | Result of Maximum of Combined WCRP | | | | | | | |
| 32 | S12 | Last WCRP | WCRP29 | | | | | | |

Fig. 6

METHOD FOR OPTIMIZING UTILIZATION OF WORKLOAD-CONSUMED RESOURCES FOR TIME-INFLEXIBLE WORKLOADS

FIELD OF THE INVENTION

The present invention relates to a method for optimizing the utilization of workload-consumed resource for time-inflexible workloads. More particularly, the present invention relates to a method for optimizing the utilization of workload-consumed resources for time-inflexible workloads by combining some of the time-inflexible workloads according to standard deviation to reduce waste of the resources.

BACKGROUND OF THE INVENTION

Nowadays, the advent of cloud-based computing architectures has created new requirements for rapid and scalable deployment of resources for web stores, media outlets, and other on-line sites or services. In general, a cloud-based architecture determines deployment of a set of resources, such as power, number of CPUs (Central Processing Units), size of storages, operating systems, bandwidth, . . . etc. Those resources can be combined or allied together for a specific workload or a group of workloads. The workload may be an email service, operation of an ERP (Enterprise Resource Planning) system, data archiving, a video streaming service, or other services mentioned above. An optimized utilization of resources for these workloads in a data center or a cloud storage system can reduce waste of resources without violating the requirement of workload performance in the SLA (Service Level Agreement). Furthermore, cost of power consumption, maintenance and new hardware supplement can be lessened.

Optimized utilization of the resources is not an easy task. This is because all the workloads are changing with time. Dynamic deployment of the resources is not able to catch up with the speed of changes. More resources for the surprising peak requirements from the operating workloads may be a safe way but not an economic one. Meanwhile, some hardware devices, e.g. HDDs (Hard Drive Disks) or SSDs (Solid State Disks) are consumables. Periodical or from-time-to-time replacement of the worn hardware devices makes it more difficult to predict the real capacities of the resources. Therefore, optimized utilization of the resources for workloads applied is a big concern for operating a data center or a cloud storage system.

There are many prior arts related to the solution for the problem mentioned above. For example, US Patent Publication No. 2011/0154353 discloses a method for a demand-driven workload scheduling optimization of shared resources used to execute tasks submitted to a computer system. Key steps of the invention includes: receiving a request to execute a task (said request including the task's required execution time and resource requirements); selecting a prospective execution schedule meeting the required execution time and a computer system resource meeting the resource requirement, determining (in response to the request) a task execution price for using the computer system resource according to the prospective execution schedule, and scheduling the task to execute using the computer system resource according to the prospective execution schedule if the price is accepted. The price varies as a function of availability of the computer system resource at times corresponding to the prospective execution schedule, said availability being measured at the time the price is determined. As to application of the disclosed invention to a data center, the task is the workload applied. The price is a measurement for deciding which task (workload) should use available resources. Optimized utilization of the resources can be done as long as the price keeps at the lowest level.

There are some limitations to the patent application. First, the workload should be "flexible" enough with time. It means that requirements of the workload should be fulfilled anytime, or at least after a while from a request for the workload is received. For some workloads which are time-inflexible, namely, the requirements of the workloads are rigid and need to be processed as soon as possible, they are not applicable for "lower prices" (or priority) being accepted. Secondly, price is hard to be quantized for each workload. It is subjective to decide the price. There is no objective standard for doing so.

There is no suitable solution for achieving an optimized utilization for time-inflexible workload-consumed resources in a data center or a cloud storage. An innovative method or a system using the method to provide such solution is desired.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to fulfill the requirement mentioned above, a method for optimizing utilization of a workload-consumed resource for time-inflexible workloads is disclosed. The method includes the steps of: A. providing a plurality of workload-consumed resource profiles and calculating a standard deviation for each workload-consumed resource profile, wherein each workload-consumed resource profile is a record of amount of a workload-consumed resource consumed by a specific time-inflexible workload over a cycle; B. determining a volume unit of the workload-consumed resource; C. sorting the workload-consumed resource profiles in a sequence according to an order of the standard deviations; D. setting the first workload-consumed resource profile in the sequence as a test workload-consumed resource profile and the second one in the sequence as a target workload-consumed resource profile; E. combining the target workload-consumed resource profile and the test workload-consumed resource profile as a combined workload-consumed resource profile; F. checking if the maximum amount in the combined workload-consumed resource profile is lower than the volume unit and a standard deviation of the combined workload-consumed resource profile is lower than that of the test workload-consumed resource profile; G. resetting the target workload-consumed resource profile by choosing the one next to the previous target workload-consumed resource profile until the last workload-consumed resource profile in the sequence is chosen as the target workload-consumed resource profile and processing step E if the check result of step F is no; H. removing the two workload-consumed resource profiles for combination and placing the combined workload-consumed resource profile in the sequence according to the order of the standard deviations if the check result of step F is yes; and I. assigning an operation amount of the workload-consumed resource for each combined workload and uncombined workload, wherein the operation amount is equal to or lower than the volume unit but greater than the maximum amount in corresponding workload-consumed resource profile of the combined workload or uncombined workload.

Preferably, the method may further include after step H the steps of: H1. repeatedly processing step D until the last workload-consumed resource profile has been combined for step F; H2. resetting the test workload-consumed resource profile as the $(n+1)^{th}$ workload-consumed resource profile in the sequence, wherein the previous test workload-consumed resource profile is the $n^{th}$ workload-consumed resource profile in the sequence; H3. checking if the current test workload-consumed resource profile is the last workload-consumed resource profile; H4. choosing the workload-consumed resource profile next to the reset test workload-consumed resource profile as the target workload-consumed resource profile if the check result in step H3 is no or processing step I if the check result in step H3 is yes; H5. repeating step E to step F until a combined workload-consumed resource profile fulfills the combination criteria in step F or the last workload-consumed resource profile has been combined for step F; H6. checking if a combined workload-consumed resource profile fulfills the combination criteria in step H5; and H7. processing H1 if the check result of step H6 is yes or processing H2 if the check result of step H6 is no.

According to the present invention, the workload-consumed resource profile may be obtained by recording the amount of the workload-consumed resource consumed by a specific workload, by predicting a trend of the amount of the workload-consumed resource consumed by the specific workload based on historical records, or by combining a portion of a predicted trend and a portion of historical records of the of amount of the workload-consumed resource consumed by the specific workload. The order may be an ascending order or a descending order. The workload-consumed resource may be power, storage capacity, bandwidth, CPU (Central Processing Unit) cores, IOPS (Input/Output Per Second), throughput, or latency consumed by the workload. The volume unit may be a portion of the workload-consumed resource assigned for workload(s) and greater than the amount any one of the workloads requires.

Preferably, the method may further include before step I the steps of: H8. inserting a new workload-consumed resource profile regarding a new workload in the sequence according to the order of the standard deviations; H9. resetting the test workload-consumed resource profile by arbitrarily choosing one workload-consumed resource profile in the sequence in front of the new one, and resetting the target workload-consumed resource profile by choosing the second one in the sequence after the reset test workload-consumed resource profile; and H10. processing step E to step H7 a number of cycles so that the test workload-consumed resource profile is behind the newly inserted workload-consumed resource profile in the sequence according to the order of the standard deviations or the newly inserted workload-consumed resource profile has been combined.

The present invention also discloses another method for optimizing utilization of a workload-consumed resource for time-inflexible workloads. The method includes the steps of: A. providing a plurality of workload-consumed resource profiles, wherein each workload-consumed resource profile is a record of amount of a workload-consumed resource consumed by a specific time-inflexible workload over a cycle; B. determining a volume unit of the workload-consumed resource; C. sorting the workload-consumed resource profiles in a sequence according to a volume descending order; D. setting the first workload-consumed resource profile in the sequence as a test workload-consumed resource profile and the second one in the sequence as a target workload-consumed resource profile; E. combining the target workload-consumed resource profile and the test workload-consumed resource profile as a combined workload-consumed resource profile; F. checking if the maximum amount in the combined workload-consumed resource profile is lower than the volume unit; G. resetting the target workload-consumed resource profile by choosing the one next to the previous target workload-consumed resource profile until the last workload-consumed resource profile in the sequence is chosen as the target workload-consumed resource profile and processing step E if the check result of step F is no; H. removing the two workload-consumed resource profiles for combination and placing the combined workload-consumed resource profile in the sequence according to the volume descending order if the check result of step F is yes; and I. assigning an operation amount of the workload-consumed resource for each combined workload and uncombined workload, wherein the operation amount is equal to or lower than the volume unit but greater than the maximum amount in corresponding workload-consumed resource profile of the combined workload or uncombined workload.

Preferably, the method may further include after step H the steps of: H1. repeatedly processing step D until the last workload-consumed resource profile has been combined for step F; H2. resetting the test workload-consumed resource profile as the $(n+1)^{th}$ workload-consumed resource profile in the sequence, wherein the previous test workload-consumed resource profile is the $n^{th}$ workload-consumed resource profile in the sequence; H3. checking if the current test workload-consumed resource profile is the last workload-consumed resource profile; H4. choosing the workload-consumed resource profile next to the reset test workload-consumed resource profile as the target workload-consumed resource profile if the check result in step H3 is no or processing step I if the check result in step H3 is yes; H5. repeating step E to step F until a combined workload-consumed resource profile fulfills the combination criteria in step F or the last workload-consumed resource profile has been combined for step F; H6. checking if a combined workload-consumed resource profile fulfills the combination criteria in step H5; and H7. processing H1 if the check result of step H6 is yes or processing H2 if the check result of step H6 is no.

According to the present invention, the workload-consumed resource profile may be obtained by recording the amount of the workload-consumed resource consumed by a specific workload, by predicting a trend of the amount of the workload-consumed resource consumed by the specific workload based on historical records, or by combining a portion of a predicted trend and a portion of historical records of the of amount of the workload-consumed resource consumed by the specific workload. The workload-consumed resource may be power, storage capacity, bandwidth, CPU (Central Processing Unit) cores, IOPS (Input/Output Per Second), throughput, or latency consumed by the workload. The volume unit may be a portion of the workload-consumed resource assigned for workload(s) and greater than the amount any one of the workloads requires.

Preferably, the method may further include before step I the steps of: H8. inserting a new workload-consumed resource profile regarding a new workload in the sequence according to the volume descending order; H9. resetting the test workload-consumed resource profile by arbitrarily choosing one workload-consumed resource profile in the sequence in front of the new one, and resetting the target workload-consumed resource profile by choosing the second one in the sequence after the reset test workload-consumed resource profile; and H10. processing step E to step H7 a number of cycles so that the test workload-consumed resource profile is behind the newly inserted workload-consumed resource profile in the sequence according to the volume descending order or the newly inserted workload-consumed resource profile has been combined.

By sorting workload-consumed resource profiles representing individual workloads in one system according to the order of standard deviation or volume descending, two workload-consumed resource profiles can be combined to check if combination criteria are fulfilled. If any combination passes the combination criteria, corresponding workloads can be combined to share the same resource from the system. Thus, optimizing utilization of the workload-consumed resource can be achieved.

BRIEF DESCRIPTION OF THE DRAWINGS

FIG. 3 tabularizes processes for finding out a combination of workloads out of 9 workloads running on a cloud system.

FIG. 5 is a table inheriting the result of an example in the first embodiment.

FIG. 6 is a table continuing the unfinished part of the example from FIG. 5.

DETAILED DESCRIPTION OF THE PREFERRED EMBODIMENTS

The present invention will now be described more specifically with reference to the following embodiments.

The present invention is to provide methods to optimize utilization of workload-consumed resources for time-inflexible workloads running in a storage system or a cloud platform. Furthermore, the methods are able to combine the time-inflexible workloads according to some of their characteristics for a given resource in the storage system or the cloud platform. Therefore, the workload-consumed resource refers to any hardware or priority in processes the storage system or the cloud platform offers the workloads. The workload-consumed resource, for example, may be power, storage capacity, bandwidth, CPU (Central Processing Unit) cores, IOPS (Input/Output Per Second), throughput, latency consumed by the workload. In the embodiments below, workload-consumed resources used are not limited to as they are. Any suitable workload-consumed resource can be used instead in the embodiments as those in the art know it is a common application. The workload-consumed resource profile may be obtained by recording the amount of the workload-consumed resource consumed by a specific workload. It can also come from predicting a trend of the amount of the workload-consumed resource consumed by the specific workload based on historical records. Here, any suitable methods, algorithms, or modules that provide such predictions can be applied. The data of the trend are best obtained by a storage traffic modeling system provided by the same inventor in U.S. patent application Ser. No. 14/290, 533. Co-reference of the same techniques can be acquired from the application. Of course, the workload-consumed resource profile may also be obtained by combining a portion of a predicted trend and a portion of historical records of the of amount of the workload-consumed resource consumed by the specific workload. It is not limited by the present invention.

First Embodiment

Figure 1:
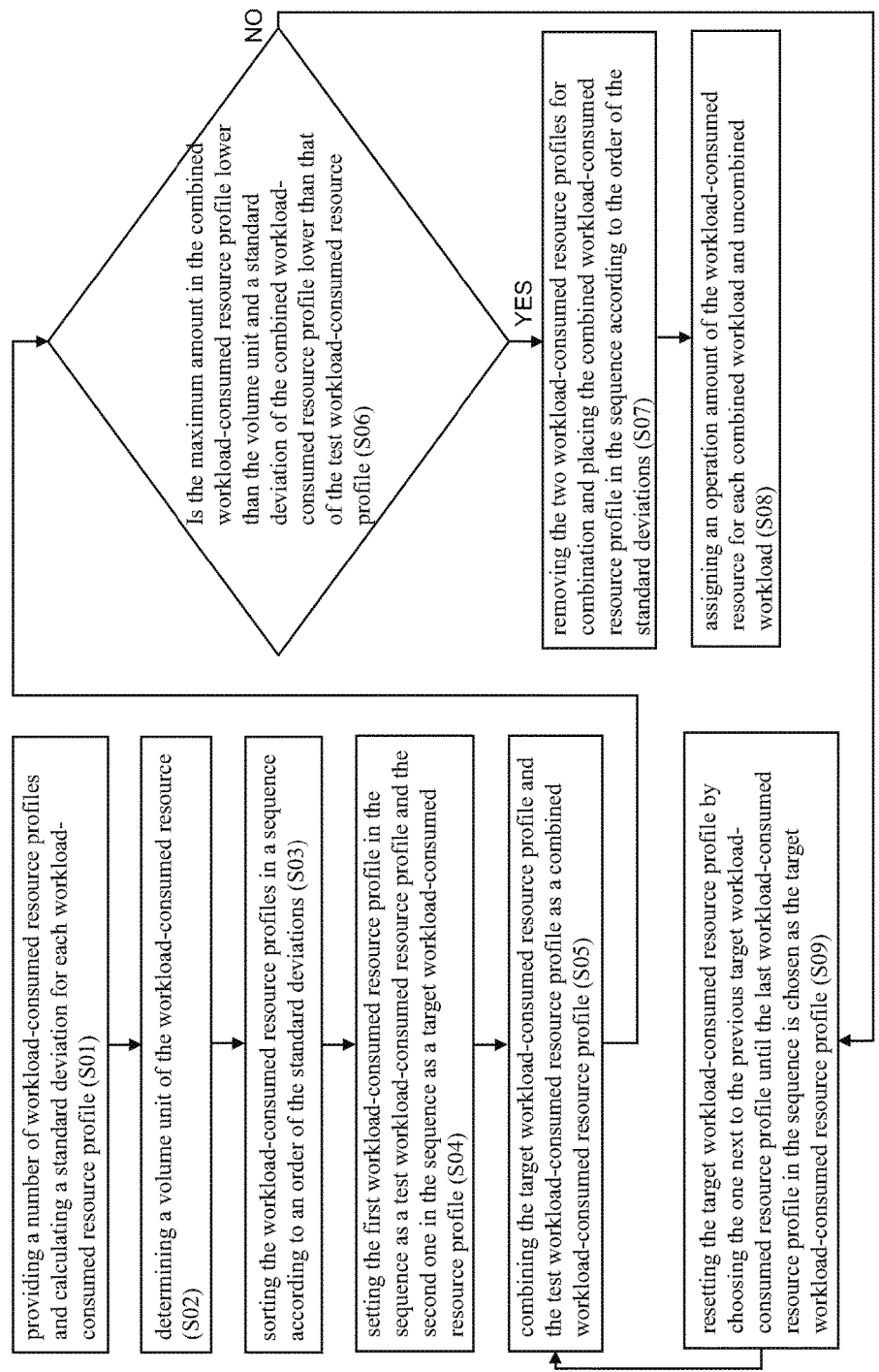
FIG. 1 is a flow chart of a method according to the present invention.

Please refer to FIG. 1. It is a flow chart of a method according to the present invention. The first step of the method is to provide a number of workload-consumed resource profiles and calculate a standard deviation for each workload-consumed resource profile (S01). According to the present invention, each workload-consumed resource profile is a record of amount of a workload-consumed resource consumed by a specific time-inflexible workload over a cycle. In order to illustrate what a so-called workload-consumed resource profile is and how the standard deviation is calculated, please see FIG. 2. The example shows a record of IOPS that a cloud E-mail service (workload) consumed during a week. The curve is the workload-consumed resource profile. From all the historical records, the curve may somehow look similar every week. A peak value happens at noon on Tuesdays and a valley occurs at midnight on Wednesdays. A trend shows that Sundays, Thursdays and Fridays almost have relative peaks for IOPS. Similar curves can be obtained every week but with different extreme values. Since E-mails should be transmitted and received in time, the workload-consumed resource of IOPS therefore should be fulfilled without any delay, and it fits the purpose of present invention perfectly. A comparison is a data archiving service which is not a time-inflexible workload because the service can be processed later in a time of low traffic flow. One week can be deemed as a cycle. The standard deviation can be obtained by below formula:

$$SD(WCR) = \sqrt{\frac{\sum_{t=t_1}^{t_n}(WCR(t) - \overline{WCR})^2}{n-1}}$$

SD(WCR) is the standard deviation calculated, n is the number of sampling during the cycle, WCR(t) refers to the value (IOPS) at each sampling point, and $\overline{WCR}$ is the mean of all sampled values of IOPSs.

Figure 2:
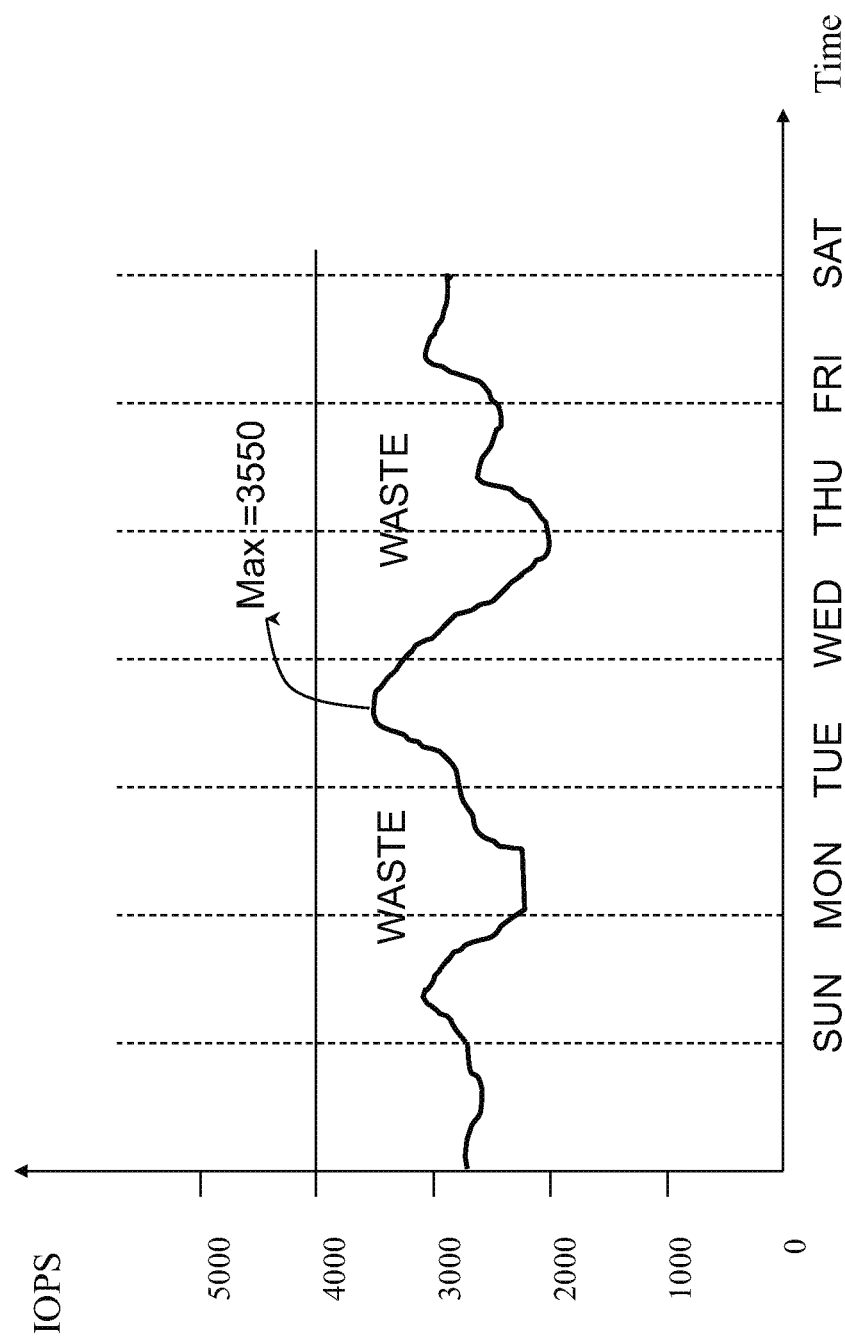
FIG. 2 shows a record of IOPS that a cloud E-mail service consumed during a week.

FIG. 2 shows a peak value of 3550. According to general consideration, an administrator should reserve 4000 IOPS from the system operating the cloud E-mail service for the cloud E-mail service. It is an easy way and doesn't have to adjust IOPS from time to time. However, it is understood that the area between IOPS=4000 and the curve means waste of resource. If another workload which shares the same give amount of IOPS (4000) with the cloud E-mail service and the combination of workload-consumed resource profiles (still a curve) is below IOPS=4000, waste of resource can be further reduced. There may be more than thousands of workloads in the system. The present invention is to find out suitable workloads (workload-consumed resource profiles) to be combined for the given resource.

The second step of the method is to determine a volume unit of the workload-consumed resource (S02). The volume unit is a portion of the workload-consumed resource assigned for workload(s) and greater than the amount any one of the workloads requires. In the example of FIG. 2, IOPS of 4000 may be used as the volume unit. The volume unit can be a minimum segmentation from the system according to the setting of the system. The larger the volume unit is. The more workloads may be combined.

Next, sort the workload-consumed resource profiles in a sequence according to an order of the standard deviations (S03). The order may be an ascending order or a descending order. Then, set the first workload-consumed resource profile in the sequence as a test workload-consumed resource profile and the second one in the sequence as a target workload-consumed resource profile (S04). The test workload-consumed resource profile and the target workload-consumed resource profile are used to describe which two are combining for test so that a qualified combination can be found. Thus, a next step is combining the target workload-consumed resource profile and the test workload-consumed resource profile as a combined workload-consumed resource profile (S05). It should be emphasized that for all embodiments in the present invention, the test or target workload-consumed resource profile may be a workload-consumed resource profile not being combined. It can also be a combined workload-consumed resource profile (workload-consumed resource profiles are combined to form a new workload-consumed resource profile).

According to FIG. 1, a judgement should be made: checking if the maximum amount in the combined workload-consumed resource profile is lower than the volume unit and a standard deviation of the combined workload-consumed resource profile is lower than that of the test workload-consumed resource profile (S06). If two combination criteria are fulfilled, i.e. the check result of step S06 is yes, remove the two workload-consumed resource profiles (the target workload-consumed resource profile and the test workload-consumed resource profile) for combination and place the combined workload-consumed resource profile in the sequence according to the order of the standard deviations (S07). Then, assign an operation amount of the workload-consumed resource for each combined workload and uncombined workload (S08). The operation amount should be equal to or lower than the volume unit but greater than the maximum amount in corresponding workload-consumed resource profile of the combined workload or uncombined workload. Take FIG. 2 as an example. The operation amount of IOPS (the workload-consumed resource) should fall between 3550 and 4000.

If at least one of the two combination criteria is not fulfilled, i.e. the check result of step S06 is no, then reset the target workload-consumed resource profile by choosing the one next to the previous target workload-consumed resource profile until the last workload-consumed resource profile in the sequence is chosen as the target workload-consumed resource profile and processing step S05 (S09). It is to say unless the two combination criteria are fulfilled, the processes from step S05, S06 to S09 will be conducted again and again with the target workload-consumed resource profile changed for combined. That is to say the first workload-consumed resource profile doesn't move, waiting for the other one to combine with it.

Below is an example implementing the provided method. Please refer to FIG. 3. FIG. 3 tabularizes processes for finding out a combination of workloads out of 9 workloads running on a cloud system. The cloud system assigns a virtual storage for each workload. The storage capacity of the virtual storage is set to be 1500 units. Totally, 13500 units are used. Thus, process no. 1 (a step field following the process number field indicates the corresponding step of the present invention that the process is in) lists all 9 workloads from WL1 to WL9. Process no. 2 lists the workload-consumed resource profiles from WCRP1 to WCRP9 corresponding to the workloads, respectively. Process no. 3 lists the calculated standard deviations of all workload-consumed resource profiles from SD1 to SD9. Then, in process no. 4, the storage capacity, 1500 units, is used as the volume unit. Process no. 5 lists the sorted result of the standard deviations in a sequence from left to right according to an ascending order (the right has larger number of standard deviation than the left). Process no. 6 lists the workload-consumed resource profiles in a sequence from left to right according to the corresponding standard deviation one field above it. Processes no. 7 and no. 8 pick up the test and target workload-consumed resource profiles, respectively. Process no. 9 shows current workload-consumed resource profiles for combination are WCRP7 and WCRP4.

Process no. 10 and no. 11 show the check results from step S06. It is found that the maximum of the combined workload-consumed resource profile is greater than the volume unit. The result of step S06 is "no". According to the method, the following step becomes step S09 and a new target workload-consumed resource profile is chosen as the WCRP2 in process no. 12. Then, process no. 13 combines WCRP7 and WCRP2. Process no. 14 and no. 15 show the current check results from step S06. This time, the combination criteria are all fulfilled. Therefore, process no. 16 confirms workload-consumed resource profiles can be combined. Process no. 17 lists all workload-consumed resource profiles, including combined and uncombined ones. Process no. 18 lists workloads according to the fields of process no. 17. It is obvious that the WL7 and WL2 can be combined to share one volume unit, 1500 units of the virtual storage. Hence, the total units of the virtual storage used drops to 12000 units. The goal of optimizing utilization of a workload-consumed resource for time-inflexible workloads is preliminarily achieved.

In the first embodiment, one set of workloads are found to be combined to share the same resource. This is just the first stage to optimize utilization of a workload-consumed resource. However, there might be other workloads which can be combined for a further optimization or best utilization. Even the combined workloads can be further combined with other workload(s) for sharing the same resource. Another embodiment of the present invention below will disclose the steps for achieving so.

Second Embodiment

Figure 4:
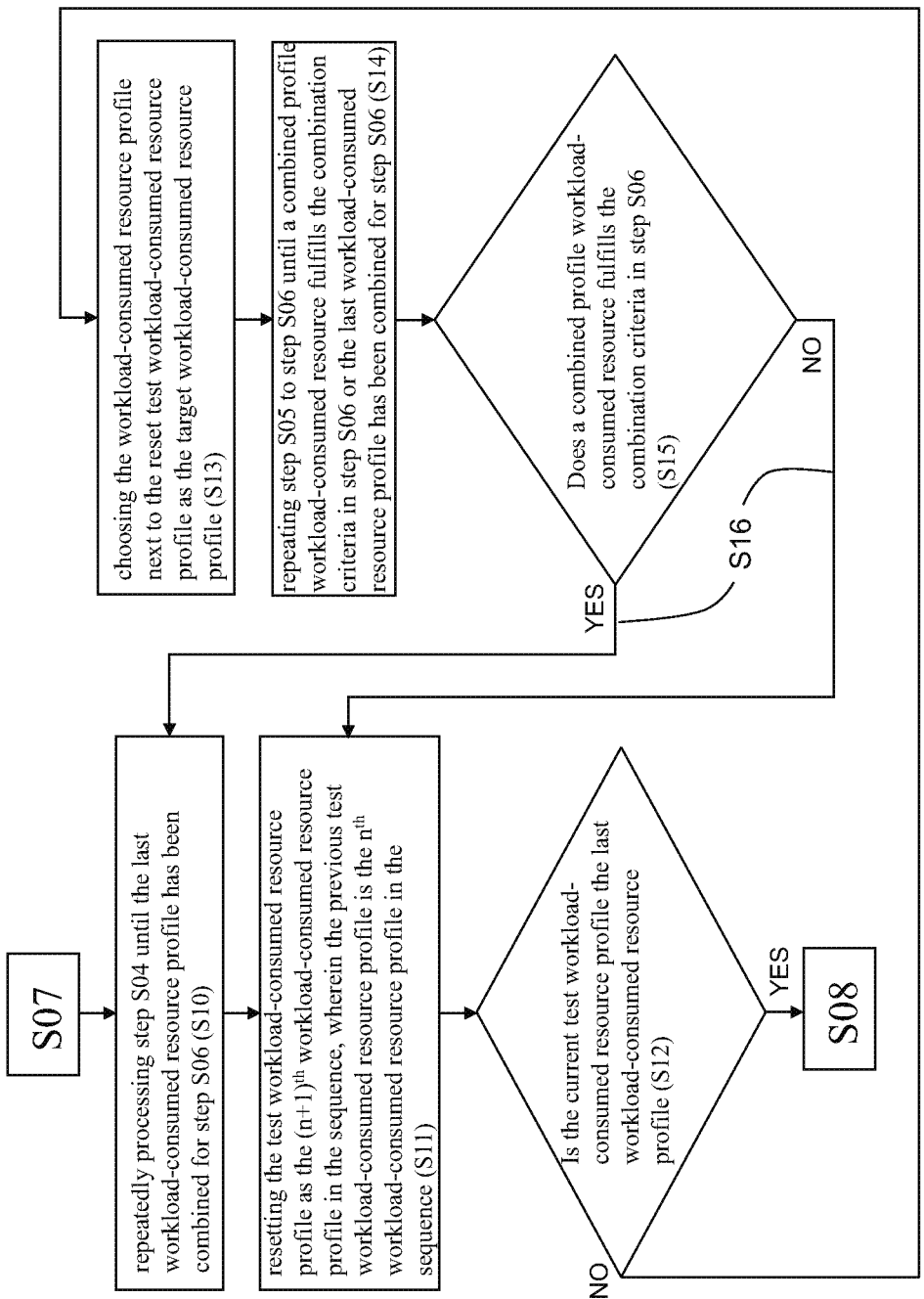
FIG. 4 is a flow chart of another method according to the present invention.

Please refer to FIG. 4. It is a flow chart of another method according to the present invention. The method disclosed in the second embodiment can refine the result in the first embodiment. It has all steps as described above and new steps, S10 to S16. A step is added to step S07 to repeatedly process step S04 until the last workload-consumed resource profile has been combined for step S06 (S10). The purpose of step S10 is to repeat step S04 to S07 (including a loop of S05-S06-S09) until the test workload-consumed resource (set as the first one of the workload-consumed resource sequence) to combined with all other workload-consumed resources for step S06. If the last one has been combined for step S06, then reset the test workload-consumed resource profile as the $(n+1)^{th}$ workload-consumed resource profile in the sequence, where the previous test workload-consumed resource profile is the $n^{th}$ workload-consumed resource profile in the sequence (S11). Step S11 means the second workload-consumed resource profile in the sequence becomes the test workload-consumed resource profile if the previous one is the first workload-consumed resource profile in the sequence. Similarly, if the previous one is the second workload-consumed resource profile in the sequence, the third workload-consumed resource profile in the sequence becomes the test workload-consumed resource profile, . . . , and so on.

The next step is to check if the current test workload-consumed resource profile is the last workload-consumed resource profile (S12). If the check result in step S12 is no, then choose the workload-consumed resource profile next to the reset test workload-consumed resource profile as the target workload-consumed resource profile (S13); if the check result in step S12 is yes, then process step S08. When the "yes" condition happens, it means the best composition of workloads combination exists. The procedure of the present method can stop. Otherwise, new test workload-consumed resource profile must be reset for coming steps. After step S13, repeat step S05 to step S06 until a combined workload-consumed resource profile fulfills the combination criteria in step S06 or the last workload-consumed resource profile has been combined for step S06 (S14). Step S14 is to utilize the same steps for operating combination of the test and target workload-consumed resource profiles and set termination conditions. Step S15 is a checking step: checking if a combined workload-consumed resource profile fulfills the combination criteria in step S06. There are two situations: if the check result of step S15 is yes, process S10; if the check result of step S15 is no, process S11 (S16).

An iteration logic of the present invention is if a new combination of workload-consumed resource profile is found, the sorting job has to start from the first one again (set the first workload-consumed resource profile as the test workload-consumed resource profile and the second workload-consumed resource profile as the target workload-consumed resource profile). If there is no suitable combination, the test workload-consumed resource profile shifts to the one in the next position until the current test workload-consumed resource profile is the last workload-consumed resource profile. Below is an example for explaining the method mentioned above.

Please refer to FIG. 5 and FIG. 6. FIG. 5 inherits the result of the example in the first embodiment from process no. 16 (no. 19 comes after no. 16 to lead to another results in the end of processes). FIG. 6 continues the unfinished part of the example from FIG. 5. The same tabularization carries on. After process no. 19, in order not to make description long-winded, some processes may include several steps.

Before process no. 19, the sequence of workload-consumed resource profiles according to the ascending order of standard deviation is CWCRP1/WCRP4/WCRP3/WCRP1/WCRP9/WCRP8/WCRP6/WCRP5. According to the method of the present invention, process no. 19 is to execute step S10. Namely, it is to try if the first workload-consumed resource profile in the sequence still has a chance to combine with another workload-consumed resource profile. The answer is no. "<SD of NT" in FIG. 5 and FIG. 6 means smaller than the standard deviation of the new test workload-consumed resource profile (CWCRP1). Now, although the sequence of workload-consumed resource profiles doesn't change, the procedure of the method comes to S11 and later (process no. 20).

In process no. 20, the test workload-consumed resource profile is reset to be the second one in the sequence, WCRP4. After trying combinations of WCRP4 with all target workload-consumed resource profiles behind, there is no combination fulfills the combination criteria. The sequence of workload-consumed resource profiles doesn't change but the test workload-consumed resource profile becomes the third one, WCRP3, in the sequence in process no. 21. However, it is found in process no. 21 that a combination of WCRP3 and WCRP8 fulfills the combination criteria. The combination is named as CWCRP2. According to step S16, step S10 must be processed for the new sequence of workload-consumed resource profiles, CWCRP1/CWCRP2/WCRP4/WCRP1/WCRP9/WCRP6/WCRP5. Process no. 22 is to process combination and check for CWCRP1 and CWCRP2. Lucky, CWCRP1 and CWCRP2 can be combined and the combined workload-consumed resource profile is named CWCRP3.

Now, the sequence of workload-consumed resource profiles is CWCRP3/WCRP4/WCRP1/WCRP9/WCRP6/WCRP5. Step S10 executes again. In process no. 23, CWCRP3 (the first one) is the test workload-consumed resource profile to try combining with other target workload-consumed resource profile. As shown in FIG. 5, there is no successful combination. According to step S11, the test workload-consumed resource profile becomes WCRP4 to continue combinations. Similarly, process no. 24 finds no suitable combination.

Please see FIG. 6. The same sequence of workload-consumed resource profiles is processed with the second one as the test workload-consumed resource profile in process no. 25. Again, no combination fulfills the combination criteria. Process no. 26 uses WCRP9 as the test workload-consumed resource profile. Similarly, no suitable combination is found.

Process no. 27 combines the last two workload-consumed resource profiles. It is found WCRP6 and WCRP5 can be combined. The combined workload-consumed resource profile is CWCRP4. According to step S16, it is required to check combination from the first again. The new sequence of workload-consumed resource profiles is CWCRP3/WCRP4/CWCRP4/WCRP1/WCRP9. From process no. 28 to process no. 31, try the target workload-consumed resource profile from CWCRP3 to WCRP1 sequentially. There is no suitable combination. In process no. 32, it is found that WCRP9 would be the last one in the sequence of workload-consumed resource profiles to be the test workload-consumed resource profile. The procedure comes to S08 to get a final combinations of workloads to share given resource. In this example, there are two combinations (W7+WL2+WL3+WL8 and WL6+WL5) and three independent workloads (WL4, WL1, and WL9). Only 7500 units of resources (1500 units for each) should be provisioned. That is to say that 6000 units are saved.

Third Embodiment

After the workloads are combined to share the given resource, it is workable for the present invention to let a new workload run in the system. There is a quick way to find the best combinations of workloads and reduce waste of resources for the current workloads and the new one.

Figure 7:
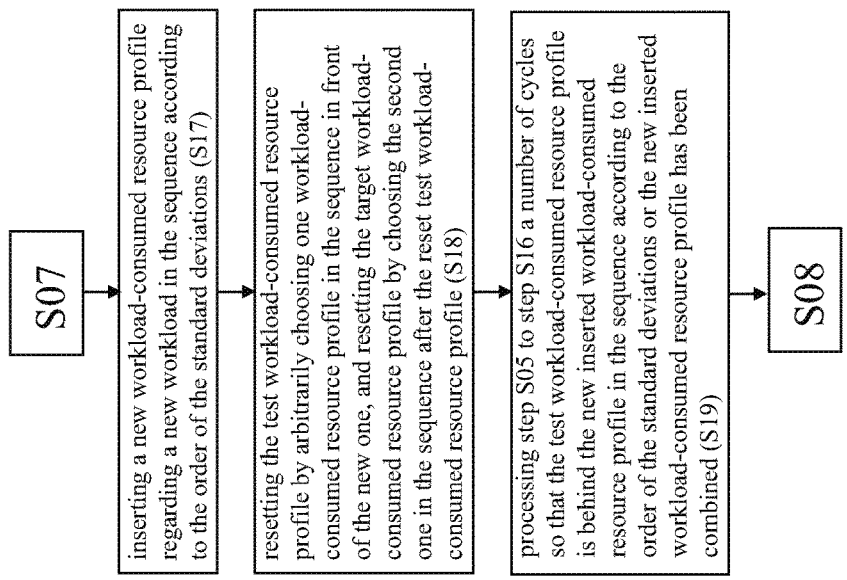
FIG. 7 is a flow chart of still another method according to the present invention.

Please refer to FIG. 7. It is a flow chart of another method according to the present invention for fulfilling said requirement. By utilizing the same flow chart in the first and second embodiments, three steps are added before step S08 (assigning resources). First, insert a new workload-consumed resource profile regarding a new workload in the sequence according to the order of the standard deviations (S17). It should be emphasized that step S17 should be processed after some of the original workloads have been combined for optimizing, although it may not be the best condition. Then, reset the test workload-consumed resource profile by arbitrarily choosing one workload-consumed resource profile in the sequence in front of the new one, and reset the target workload-consumed resource profile by choosing the second one in the sequence after the reset test workload-consumed resource profile (S18). It is to say choosing of the test workload-consumed resource profile doesn't need to come from the first one of the sequence of workload-consumed resource profiles. It may use, for example the second one in front of the newly inserted workload-consumed resource profile, to be the starting test workload-consumed resource profile. The last step is processing step S05 to step S16 a number of cycles so that the test workload-consumed resource profile is behind the newly inserted workload-consumed resource profile in the sequence according to the order of the standard deviations or the newly inserted workload-consumed resource profile has been combined (S19). Obviously, if there are too many workloads, the procedure can be stopped any time after the newly inserted workload-consumed resource profile has been combined for checking combination criteria. It is time saving.

Fourth Embodiment

In the previous embodiments, the sequence of workload-consumed resource profiles follows an ascending order or a descending order of standard deviations. According to the spirit of the present invention, the order can be a volume descending order (the maximum volume of resource a workload or combined workload consume). This embodiment describes how to fulfill.

It is quite simple. Utilize the flow charts for the previous embodiments for illustration. There are several differences. First, the workload-consumed resource profiles provided don't have to be calculated for the standard deviations (in step S01). Second, sorting of the workload-consumed resource profiles is based on the volume descending order, rather than the order of standard deviations (in step S03). Third, the combination criteria lefts only "if the maximum amount in the combined workload-consumed resource profile is lower than the volume unit". Standard deviation is not a judgement any more (in step S05). Last, change inserting order in steps S17 and S19 to be the volume descending order. The rest of the steps and related operations remain the same.

It should be noticed that for the embodiments above, the provided workload-consumed resource profiles can be divided into groups. Each group of workload-consumed resource profiles can be processed with the method in the first or second embodiment to find out some combinations of workloads. Then, the processed workload-consumed resource profiles of the groups are collected to be apply the present invention again. It is also in the scope of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A method for optimizing utilization of a workload-consumed resource for time-inflexible workloads, comprising the steps of:

A. providing a plurality of workload-consumed resource profiles and calculating a standard deviation for each workload-consumed resource profile, wherein each workload-consumed resource profile is a record of amount of a workload-consumed resource consumed by a specific time-inflexible workload over a cycle;

B. determining a volume unit of the workload-consumed resource;

C. sorting the workload-consumed resource profiles in a sequence according to an order of the standard deviations;

D. setting the first workload-consumed resource profile in the sequence as a test workload-consumed resource profile and the second one in the sequence as a target workload-consumed resource profile;

E. combining the target workload-consumed resource profile and the test workload-consumed resource profile as a combined workload-consumed resource profile;

F. checking if the maximum amount in the combined workload-consumed resource profile is lower than the volume unit and a standard deviation of the combined workload-consumed resource profile is lower than that of the test workload-consumed resource profile;

G. resetting the target workload-consumed resource profile by choosing the one next to the previous target workload-consumed resource profile until the last workload-consumed resource profile in the sequence is chosen as the target workload-consumed resource profile and processing step E if the check result of step F is no;

H. removing the two workload-consumed resource profiles for combination and placing the combined workload-consumed resource profile in the sequence according to the order of the standard deviations if the check result of step F is yes; and I. assigning an operation amount of the workload-consumed resource for each combined workload and uncombined workload, wherein the operation amount is equal to or lower than the volume unit but greater than the maximum amount in corresponding workload-consumed resource profile of the combined workload or uncombined workload.

2. The method according to claim 1, further comprising after step H the steps of:

H1. repeatedly processing step D until the last workload-consumed resource profile has been combined for step F;

H2. resetting the test workload-consumed resource profile as the $(n+1)^{th}$ workload-consumed resource profile in the sequence, wherein the previous test workload-consumed resource profile is the $n^{th}$ workload-consumed resource profile in the sequence;

H3. checking if the current test workload-consumed resource profile is the last workload-consumed resource profile;

H4. choosing the workload-consumed resource profile next to the reset test workload-consumed resource profile as the target workload-consumed resource profile if the check result in step H3 is no or processing step I if the check result in step H3 is yes;

H5. repeating step E to step F until a combined workload-consumed resource profile fulfills the combination criteria in step F or the last workload-consumed resource profile has been combined for step F;

H6. checking if a combined workload-consumed resource profile fulfills the combination criteria in step H5; and H7. processing H1 if the check result of step H6 is yes or processing H2 if the check result of step H6 is no.

3. The method according to claim 1, wherein the workload-consumed resource profile is obtained by recording the amount of the workload-consumed resource consumed by a specific workload, by predicting a trend of the amount of the workload-consumed resource consumed by the specific workload based on historical records, or by combining a portion of a predicted trend and a portion of historical records of the of amount of the workload-consumed resource consumed by the specific workload.

4. The method according to claim 1, wherein the order is an ascending order or a descending order.

5. The method according to claim 1, wherein the workload-consumed resource is power, storage capacity, bandwidth, CPU (Central Processing Unit) cores, IOPS (Input/Output Per Second), throughput, or latency consumed by the workload.

6. The method according to claim 1, wherein the volume unit is a portion of the workload-consumed resource assigned for workload(s) and greater than the amount any one of the workloads requires.

7. The method according to claim 1, further comprising before step I the steps of:
   H8. inserting a new workload-consumed resource profile regarding a new workload in the sequence according to the order of the standard deviations;
   H9. resetting the test workload-consumed resource profile by arbitrarily choosing one workload-consumed resource profile in the sequence in front of the new one, and resetting the target workload-consumed resource profile by choosing the second one in the sequence after the reset test workload-consumed resource profile; and
   H10. processing step E to step H7 a number of cycles so that the test workload-consumed resource profile is behind the newly inserted workload-consumed resource profile in the sequence according to the order of the standard deviations or the newly inserted workload-consumed resource profile has been combined.

8. The method according to claim 2, further comprising before step I the steps of:
   H8. inserting a new workload-consumed resource profile regarding a new workload in the sequence according to the order of the standard deviations;
   H9. resetting the test workload-consumed resource profile by arbitrarily choosing one workload-consumed resource profile in the sequence in front of the new one, and resetting the target workload-consumed resource profile by choosing the second one in the sequence after the reset test workload-consumed resource profile; and
   H10. processing step E to step H7 a number of cycles so that the test workload-consumed resource profile is behind the newly inserted workload-consumed resource profile in the sequence according to the order of the standard deviations or the newly inserted workload-consumed resource profile has been combined.

9. A method for optimizing utilization of a workload-consumed resource for time-inflexible workloads, comprising the steps of:
   A. providing a plurality of workload-consumed resource profiles, wherein each workload-consumed resource profile is a record of amount of a workload-consumed resource consumed by a specific time-inflexible workload over a cycle;
   B. determining a volume unit of the workload-consumed resource;
   C. sorting the workload-consumed resource profiles in a sequence according to a volume descending order;
   D. setting the first workload-consumed resource profile in the sequence as a test workload-consumed resource profile and the second one in the sequence as a target workload-consumed resource profile;
   E. combining the target workload-consumed resource profile and the test workload-consumed resource profile as a combined workload-consumed resource profile;
   F. checking if the maximum amount in the combined workload-consumed resource profile is lower than the volume unit;
   G. resetting the target workload-consumed resource profile by choosing the one next to the previous target workload-consumed resource profile until the last workload-consumed resource profile in the sequence is chosen as the target workload-consumed resource profile and processing step E if the check result of step F is no;
   H. removing the two workload-consumed resource profiles for combination and placing the combined workload-consumed resource profile in the sequence according to the volume descending order if the check result of step F is yes; and
   I. assigning an operation amount of the workload-consumed resource for each combined workload and uncombined workload, wherein the operation amount is equal to or lower than the volume unit but greater than the maximum amount in corresponding workload-consumed resource profile of the combined workload or uncombined workload.

10. The method according to claim 9, further comprising after step H the steps of:
   H1. repeatedly processing step D until the last workload-consumed resource profile has been combined for step F;
   H2. resetting the test workload-consumed resource profile as the $(n+1)^{th}$ workload-consumed resource profile in the sequence, wherein the previous test workload-consumed resource profile is the $n^{th}$ workload-consumed resource profile in the sequence;
   H3. checking if the current test workload-consumed resource profile is the last workload-consumed resource profile;
   H4. choosing the workload-consumed resource profile next to the reset test workload-consumed resource profile as the target workload-consumed resource profile if the check result in step H3 is no or processing step I if the check result in step H3 is yes;
   H5. repeating step E to step F until a combined workload-consumed resource profile fulfills the combination criteria in step F or the last workload-consumed resource profile has been combined for step F;
   H6. checking if a combined workload-consumed resource profile fulfills the combination criteria in step H5; and
   H7. processing H1 if the check result of step H6 is yes or processing H2 if the check result of step H6 is no.

11. The method according to claim 9, wherein the workload-consumed resource profile is obtained by recording the amount of the workload-consumed resource consumed by a specific workload, by predicting a trend of the amount of the workload-consumed resource consumed by the specific workload based on historical records, or by combining a portion of a predicted trend and a portion of historical records of the of amount of the workload-consumed resource consumed by the specific workload.

12. The method according to claim 9, wherein the workload-consumed resource is power, storage capacity, bandwidth, CPU (Central Processing Unit) cores, IOPS (Input/Output Per Second), throughput, or latency consumed by the workload.

13. The method according to claim 9, wherein the volume unit is a portion of the workload-consumed resource assigned for workload(s) and greater than the amount any one of the workloads requires.

14. The method according to claim 9, further comprising before step I the steps of:
- H8. inserting a new workload-consumed resource profile regarding a new workload in the sequence according to the volume descending order;
- H9. resetting the test workload-consumed resource profile by arbitrarily choosing one workload-consumed resource profile in the sequence in front of the new one, and resetting the target workload-consumed resource profile by choosing the second one in the sequence after the reset test workload-consumed resource profile; and
- H10. processing step E to step H7 a number of cycles so that the test workload-consumed resource profile is behind the newly inserted workload-consumed resource profile in the sequence according to the volume descending order or the newly inserted workload-consumed resource profile has been combined.

15. The method according to claim 10, further comprising before step I the steps of:
- H8. inserting a new workload-consumed resource profile regarding a new workload in the sequence according to the volume descending order;
- H9. resetting the test workload-consumed resource profile by arbitrarily choosing one workload-consumed resource profile in the sequence in front of the new one, and resetting the target workload-consumed resource profile by choosing the second one in the sequence after the reset test workload-consumed resource profile; and
- H10. processing step E to step H7 a number of cycles so that the test workload-consumed resource profile is behind the newly inserted workload-consumed resource profile in the sequence according to the volume descending order or the newly inserted workload-consumed resource profile has been combined.

* * * * *